US008685886B2

(12) United States Patent
Reus et al.

(10) Patent No.: US 8,685,886 B2
(45) Date of Patent: Apr. 1, 2014

(54) SEED COATING COMPOSITION

(75) Inventors: Henricus A. M. Reus, Lutjebroek (NL);
Jantien Glas, Hoogkarspel (NL)

(73) Assignee: Incotec Europe B.V., Enkhuizen (NL)

(*) Notice: Subject to any disclaimer, the term of this patent is extended or adjusted under 35 U.S.C. 154(b) by 6 days.

(21) Appl. No.: 13/138,636

(22) PCT Filed: Mar. 17, 2010

(86) PCT No.: PCT/NL2010/050140
§ 371 (c)(1),
(2), (4) Date: Nov. 23, 2011

(87) PCT Pub. No.: WO2010/107312
PCT Pub. Date: Sep. 23, 2010

(65) Prior Publication Data
US 2012/0065060 A1    Mar. 15, 2012

(30) Foreign Application Priority Data

Mar. 17, 2009  (EP) .................................... 09155415

(51) Int. Cl.
*A01N 25/26*     (2006.01)
*A01N 25/00*     (2006.01)
(52) U.S. Cl.
USPC .......................... 504/100; 504/116.1; 424/405
(58) Field of Classification Search
None
See application file for complete search history.

(56) References Cited

U.S. PATENT DOCUMENTS

| 4,879,839 | A  | * | 11/1989 | Gago et al. ............. 47/57.6 |
| 5,787,640 | A  |   | 8/1998  | Duke |
| 5,876,739 | A  | * | 3/1999  | Turnblad et al. ........... 424/408 |
| 5,918,413 | A  | * | 7/1999  | Otani et al. ............. 47/57.6 |
| 6,646,023 | B1 | * | 11/2003 | Nyssen ................. 523/122 |
| 7,168,205 | B2 | * | 1/2007  | Hartle et al. ............ 47/57.6 |
| 2007/0207927 | A1 | * | 9/2007 | Rosa et al. ............... 504/100 |

FOREIGN PATENT DOCUMENTS

WO    WO 2009021986  A1 *  2/2009
WO    WO 2010/107312        9/2010

OTHER PUBLICATIONS

AGM Container, "Particle Size—US Sieve Series and Tyler Mesh Size Equivalents," <http://www.agmcontainer.com/desiccantcity/pdfs/Mesh_Size_Equivalents.pdf>, Aug. 23, 2003, p. 1-2.*
International Search Report PCT/NL2010/050140 dated Jun. 22, 2010.
Product Sheet of Bayferrox® Rot 130 M, Jun. 4, 2012 Edition, 5 sheets.

* cited by examiner

*Primary Examiner* — Tracy Vivlemore
*Assistant Examiner* — Monica Shin
(74) *Attorney, Agent, or Firm* — TraskBritt, P.C.

(57) ABSTRACT

The invention is directed to a seed coating composition, to a seed coating cocktail, to a method for preparing a coated seed, to a coated seed, and to the use of specific inorganic particles. The seed coating composition for a seed comprises water and at least 35 wt. % by weight of the coating composition of inorganic particles, wherein the mean particle size (D50) of said inorganic particles as measured by laser obscuration time technology is 250 μm or less.

21 Claims, 1 Drawing Sheet

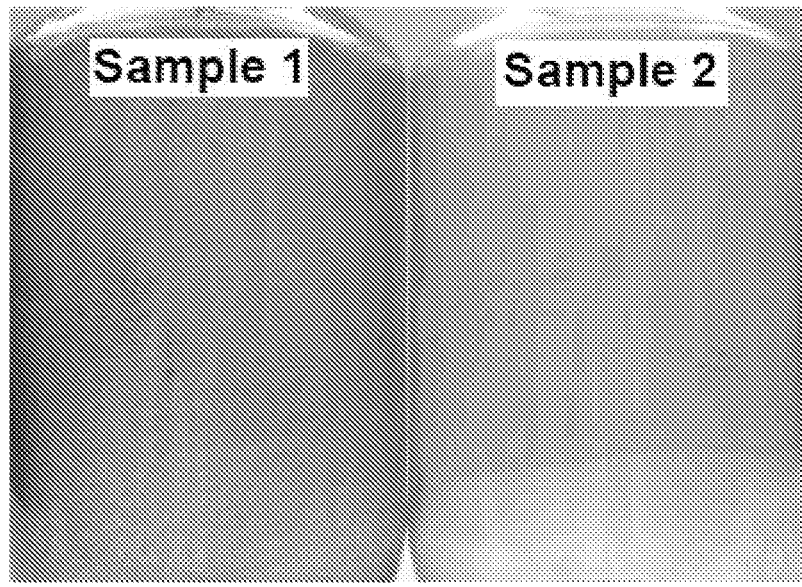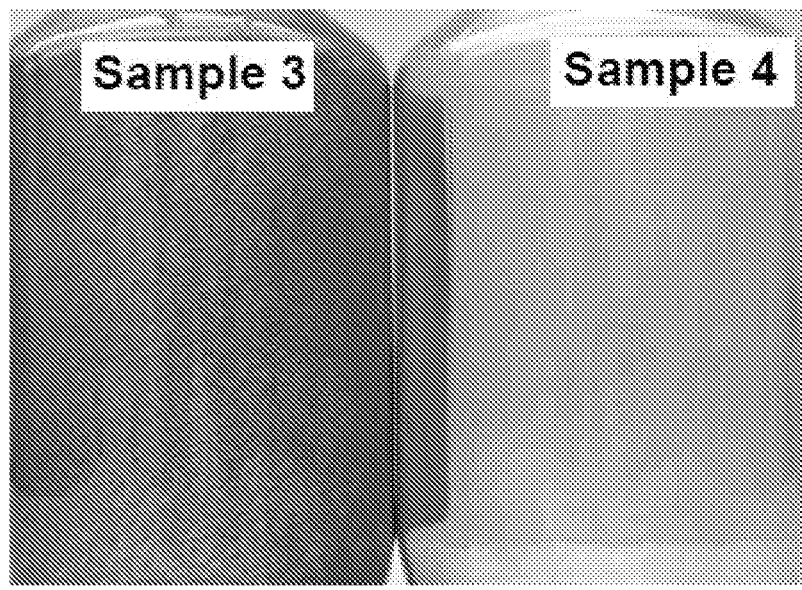

SEED COATING COMPOSITION

The invention is directed to a seed coating composition, to a method for preparing a coated seed, to a coated seed, and to the use of specific inorganic particles.

For various reasons, it is known to provide plant seeds with a coating. It is for instance common to provide seeds with a coating to protect the seeds from damage during handling, to prevent dust and give a cosmetic appearance. Such coatings can also afford the advantages of protecting the seeds from pests and diseases attack and smoothing the seed surface to make planting easier. In order to control the seed germination, or the germination rate, plant nutrients or other growth stimulating agents can be incorporated into the seed coating. Plant protecting agents, such as pesticides (e.g. fungicides and insecticides), may be incorporated to further protect the seed from disease and/or pest attack.

It can be technically challenging to prepare a suitable seed coating composition in order to overcome common problems when applying seed coating cocktails on plant seeds. The seeds must be able to dry satisfactorily after coating and must not agglomerate. However, in practice it turns out to be rather difficult to prepare coated seeds that do not have sticky surface and do not agglomerate. Coated seeds that are sticky can have serious negative effects on further processing and handling of the seeds. The coated seed can for instance stick to the wall of the treatment drum, or it can stick to a conveyor belt or in a container. Also in further processing, the stickiness of the coated seed may form problems, such as during packaging, storage and/or sowing.

Previous attempts to overcome the stickiness that is induced by the seed coating include the application of a powder, such as talc or mica, onto the coated sticky seeds (see for instance U.S. Pat. No. 5,787,640). However, the application of such powders is accompanied by severe and undesirable dusting during processing. This not only leads to an unhealthy working environment, but can also cause undesirable deposits on coating machinery and in severe cases may result in malfunction of the coating machinery. In addition, such dusting can be disadvantageous during sowing.

Accordingly, there is a strong need in the art for overcoming the above-mentioned stickiness problems associated with conventional liquid seed coating and allow the preparation of a coated seed in which the seed does not stick to each other and to contact surfaces. Furthermore, it would be desirable to provide a seed coating composition that allows an easy flow of the coated seeds and does not give undesirable dusting during the coating process, or during further handling, e.g. during sowing.

Object of the invention is to provide a seed coating composition, which at least partly overcomes the above-mentioned disadvantages.

This object has been met by providing a seed coating composition, which composition comprises specific particles.

Accordingly, in a first aspect, the invention is directed to a seed coating composition comprising water and at least 30 wt. % by weight of the seed coating composition of inorganic particles, wherein the mean particle size (D50) as measured by laser obscuration time technology is 250 μm or less.

The seed coating composition of the invention advantageously provides a coating around the seed, which negates the stickiness of the surface and thereby prevents agglomeration of seeds.

BRIEF DESCRIPTION OF THE FIGURE

FIG. 1 are four photographs of the emptied seed bottles of Example 5, corresponding to samples 1-4.

DETAILED DESCRIPTION

An insecticidal seed coating comprising a binder, a filler, and an insecticide, wherein the binder forms a matrix for the insecticide and filler is known from U.S. Pat. No. 5,876,739. This is said to result in a substantially non-phytotoxic seed coating. This document is completely silent with respect to the stickiness of the coated seed. Neither the mean particle size of the filler particles, nor the filler content in the coating composition is disclosed.

Suitable inorganic particles include silicate particles, carbonate particles and sulphate particles.

Examples of suitable silicate particles are silicate minerals, including clay minerals (such as kaolin, illite, smectite, montmorillonite, vermiculite, talc, palygorskite, and pyrophyllite) and micas (such as phlogopite, biotite, zinnwaldite, lepidolite, muscovite, gluaconite, and clintonite). Preferred silicate particles include kaolinite, talc and mica.

Suitable carbonate particles include carbonate minerals, such as calcium carbonate (commonly referred to as chalk), magnesium carbonate, sodium carbonate, barium carbonate, and dolomites (such as $CaFe(CO_3)_2$, $CaMg(CO_3)_2$, $CaZn(CO_3)_2$, and $BaCa(CO_3)_2$). Preferred carbonate particles include calcium carbonate and dolomite.

Suitable sulphate particles include calcium sulphate, strontium sulphate and barium sulphate. The preferred sulphate is barium sulphate.

Further inorganic particles that may be used in accordance with the invention include quartz, zeolites, pumice, perlite, diatomaceous earth, pyrogene silica, $Sb_2O_3$, $TiO_2$, lithopone, ZnO, and hydrated aluminium oxide.

In an embodiment the seed coating composition comprises at least two selected from the group consisting of silicate particles, carbonate particles and sulphate particles. In a further embodiment the seed coating composition comprises silicate particles, carbonate particles and sulphate particles.

In an attractive embodiment, the seed coating composition comprises dolomite particles, in particular $CaMg(CO_3)_2$ particles. Very good results have been obtained with seed coating compositions comprising these particles.

Preferably, the mean particle size (D50) of the particles in the seed coating composition of the invention as measured by laser obscuration time technology is 10 μm or more, such as 20 μm or more, or 30 μm or more. When this mean particle size is smaller than 10 μm the effect on the stickiness of the seed surface becomes less. On the other hand, it is preferred that at least 50% of the particles have a mean particle size (D50) is 250 μm or less, such as 200 μm or less, or 150 μm or less. If the size of the particles is too large, the seed coating composition becomes sandy, and thereby complicates the coating process. The term "mean particle size (D50)" as used in this application is meant to refer to the numerical value, expressed in microns, at which 50 percent of the mass percentage of the particles have particle sizes which are less than or equal to that value. Thus, in case the mean particle size (D50) is 250 μm, 50 wt. % of the particles have a particle size of 250 μm or less.

The inventors further found that the particle size distribution plays a role in the handling properties of the resulting seed coating composition. The mean particle size (D90), the numerical value, expressed in microns, at which 90 percent of the mass percentage of the particles have particle sizes which are less or equal to that value, is preferably at most 100 µm. If the mean particle size (D90) is higher than the formulation becomes very sandy. Moreover, the stability of the formulation is adversely affected, because the larger particles tend to precipitate. Accordingly, a mean particle size (D90) of more than 100 µm is not favourable from a handling point of view. Nevertheless, it may be applied by using severe stirring in order to maintain the formulation homogeneous.

In addition, coarse particles, such as particles having a mean particle size (D90) of 150 µm or more result in a better flow of the coating composition, but yield coated seeds that are more sticky than finer particles, such as particles having a mean particle size (D90) of 100 µm or less.

The amount of the particles in the seed coating composition of the invention is 35 wt. % or more, based on the total weight of the coating composition, such as 40 wt. % or more, or 50 wt. % or more. A lower concentration of the particles in the composition generally results in more stickiness of the coated seed surfaces. The upper limit of the particles in the seed coating composition of the invention can be 98 wt. %, based on the total weight of the coating composition, such as 95 wt. %, 90 wt. % or 80 wt. %.

Suitably, the amount of water in the seed coating composition of the invention can be 1 wt. % or more, based on the total weight of the coating composition, such as 5 wt. % or more. The amount of water is usually not more than 50 wt. %, based on the total weight of the coating composition, such as 40 wt. % or 30 wt. %.

The seed coating composition of the invention can further comprise a binder. Binders for use in seed coating compositions are well-known in the art and suitable examples thereof include water-soluble polymers, such as polyvinyl acetate, polyvinyl alcohol, polyvinyl pyrrolidone, polyurethane, methyl cellulose, carboxymethyl cellulose, hydroxylpropyl cellulose, sodium alginate, polyurethane, polyacrylate, casein, gelatin, pullulan, polyacrylamide, polyethylene oxide, polystyrene, styrene acrylic copolymers, styrene butadiene polymers, and poly(N-vinylacetamide). Also waxes such as carnauba wax, paraffin wax, polyethylene wax, bees wax, and polypropylene wax can be used as a binder or as an extra flow additive. Also, ethylene vinyl acetate can suitably be used as a binder.

The amount of the binder in the seed coating composition of the invention can be 1 wt. % or more, based on the total weight of the coating composition, preferably 10 wt. % or more. The upper limit of the binder in the seed coating composition of the invention can be 80 wt. %, based on the total weight of the coating composition, preferably 60 wt. %.

In an advantageous embodiment, the seed coating composition of the invention further comprises a so-called wetting and dispersing additive (sometimes also referred to as pigment dispersant). Suitable wetting and dispersing additives include ionic and non-ionic products and include solutions of polyacrylates, organo-modified polyacrylates, sodium polyacrylates, polyurethanes, phosphoric acid esters, star polymers, and/or modified polyethers.

Depending on the type of inorganic particle the amount of wetting and dispersing additive may vary. The wetting and dispersing additive can for instance be present in the seed coating composition of the invention in an amount of 0-40 wt. % or more, based on the total weight of the inorganic particles.

The inventors found that the presence of a wetting and dispersing agent in the seed coating composition of the invention can aid in mixing the inorganic particles in the seed coating composition. In addition, the presence of a wetting and dispersing agent was found to have a positive effect on the flow ability of the coated seeds.

The coating composition of the invention can further comprise additives, such as an additional solvent, a thickener, a colouring agent, an anti-foaming agent, a biocide, a surfactant and an effect pigment.

Suitable additional solvents include alcohol, butyl glycol, texanol ((3-hydroxy-2,2,4-trimethyl-pentyl) 2-methylpropanoate) and mixtures thereof. The one or more additional solvents may be present in the seed coating composition of the invention in an amount of 0-5 wt. %, based on the total weight of the seed coating composition.

Suitable thickeners include agar, carboxy methylcellulose, carrageen, chitin, fucoidan, ghatti, gum arabic, karaya, laminaran, locust bean gum, pectin, alginate, guar gum, xanthane gum and tragacanth, bentonite clays, HEUR (hydrophobically modified, ethoxylated urethane) thickeners, HASE (hydrophobically modified, alkali-swellable emulsion) thickeners and polyacrylates. The gums are generally preferred because of their low cost, ready availability and superior ability to enhance the physical characteristics of the resultant film. The thickener may be present in the seed coating composition of the invention in an amount of 0.1-2 wt. %, based on the total weight of the coating composition. Concentrations of greater than 2 wt % result in a viscose product which is difficult to use.

Suitable colouring agents can be dyes or pigmented colourants. Suitable dyes include: anthraquinone, triphenylmethane, phthalocyanine and derivatives thereof, and diazonium salts. Colourants can contain pigments such as pigment red 112 (CAS No. 6535-46-2), pigment red 2 (CAS No. 6041-94-7), pigment red 48:2 (CAS No. 7023-61-2), pigment blue 15:3 (CAS No. 147-14-8), pigment green 36 (CAS No. 14302-13-7), pigment green 7 (CAS No. 1328-53-6), pigment yellow 74 (CAS No. 6358-31-2), pigment orange 5 (CAS No. 3468-63-1), pigment violet 23 (CAS No. 6358-30-1), pigment black 7 (CAS No. 97793-37-8), and pigment white 6 (CAS No. 98084-96-9). The colouring agent may be present in the seed coating composition of the invention in an amount of 0-50 wt. %, based on the total weight of the coating composition.

Suitable anti-foaming agents include polyethylene glycol, glycerine, mineral oil defoamers, silicone defoamers, non-silicone defoamers (such as polyethers, polyacrylates), dimethylpolysiloxanes (silicone oils), arylalkyd modified polysiloxanes, and polyether siloxane copolymer containing fumed silica. The anti-foaming agent may be present in the seed coating composition of the invention in an amount of 0.1-0.3 wt. %, based on the total weight of the coating composition.

Suitable effect pigments include pearlescent pigment in different particle sizes. Effect pigments having a particle size of 15 µm or less, or a particle size of 60 µm or less, are commonly used. The particle size of the effect pigments is normally not more than 200 µm, preferably not more than 100 µm. Usually, the particle size of the effect pigment is 1 µm or more. Another effect pigment can be aluminium. All effect pigments are commonly used to create a nice cosmetic look on the seeds.

A biocide can be included in the seed coating composition of the invention in order to prolong the shelf life of the seed coating composition before being applied to a seed, such as when being stored.

Suitable biocides include MIT (2-methyl-4-isothiazolin-3-one, CAS No. 2682-20-4) and BIT (1,2-benzisothiazolin-3-one; CAS No. 2632-33-5)

The seed coating composition can be prepared by blending the various ingredients together. The seed coating composition of the invention can be added to a second composition which comprises specific plant enhancing agents to produce a so-called seed coating cocktail.

Hence, in this way a seed coating cocktail can be prepared which thereafter can be applied to a seed.

It has been found that specific plant enhancing agents and/or growth stimulating agents often used in seed coating cocktails do not, hardly, or slowly dry and accordingly give rise to disadvantageous sticking properties. The seed coating composition of the invention advantageously reduces or prevents these sticking properties without causing undesirable dusting.

The term "plant enhancing agent" as used in this application is meant to comprise any component that is in one way or another advantageous for a plant or a plant seed. The term "plant or plant seed" in this context also includes, a pelleted seed, a true seed, a plant seedling, a rootstock, plant cuttings or plant parts such as a potato tuber or flower bulb.

Examples of plant enhancing agents include fungicidal agents, bactericidal agents, insecticidal agents, nematicidal agents, and other biocides. Further plant enhancing agents include disinfectants, micro-organisms, rodent killer, weed killer (herbicide), attracting agents, repellent agents, plant growth regulators (such as giberillic acid, auxine or cytokine), nutrients (such as gebassium nitrate, magnesium sulphate, iron chelate), plant hormones, minerals, plant extracts, acaricides or miticides, molluscicides, germination stimulants, pheromones, biological preparations, chitosan, chitine-based preparations, etc.

Typical fungicidal agents include Captan (N-trichloromethyl)thio-4-cyclohexane-1,2-dicarboximide), Thiram (tetramethylthioperoxydicarbonic diamide; commercially available under the tradename Proseed), Metalaxyl (methyl N-(2,6-dimethylphenyl)-N-(methoxyacetyl)-DL-alaninate), Fludioxonil (4-(2,2-difluoro-1,3-benzodioxol-4-yl)-1-H-pyrrol-3-carbonitril; commercially available in a blend with mefonoxam under the tradename Maxim XL), difenoconazole (commercially available under the tradename Dividend 3FS), carbendazim iprodione (commercially available under the tradename Rovral®), ipconazole, mefonoxam (commercially available under the tradename Apron XL), tebuconazole, carboxin, thiabendazole, azoxystrobin, prochloraz, and Oxadixyl (N-(2,6-dimethylphenyl)-2-methoxy-N-(2-oxo-3-oxazolidinyl) acetamide). The fungicide can be included in the seed coating composition of the invention in an amount of 0.0001-10 wt. %, based on the total weight of the coated seeds.

Typical bactericidal agents include streptomycin, penicillins, tetracyclines, ampicillin, and oxolinic acid.

Typical insecticidal agents include pyrethroids, organophosphates, caramoyloximes, pyrazoles, amidines, halogenated hydrocarbons, neonicotinoids, and carbamates and derivatives thereof. Particularly suitable classes of insecticides include organophosphates, phenylpyrazoles and pyrethoids. Preferred insecticides are those known as terbufos, chlorpyrifos, fipronil, chlorethoxyfos, tefluthrin, carbofuran, imidacloprid, and tebupirimfos. Commercially available insecticides include imidacloprid (commercially available under the tradename Gaucho®), and clothianidin (commercially available from Bayer under the tradename Poncho®), thiometoxam (commercially available from Syngenta under the tradename Cruiser®) and fipronil (commercially available from BASF under the tradename Regent®). The insecticide can be included in the seed coating composition of the invention in an amount of 0.001-10 wt. %, based on the total weight of the coated seeds.

Commercially available nematicidal agents include abamectin (commercially available from Syngenta under the tradename Avicta®) thiodicarb (commercially available from Bayer under the tradename Aeris®).

The seed coating composition of the invention can be applied to a wide variety of different seeds. Some examples include seeds of soybean, corn, peas, cabbage, spinach, and cereals.

In a further aspect, the invention is directed to a method for preparing a coated seed, comprising coating a seed with a seed coating composition according to the invention. The method of the invention suitably overcomes the problems faced in the prior art with dusting.

In an embodiment the seed is coated with a blend of the seed coating composition of the invention and a second composition comprising a plant enhancing agent, preferably selected from the group consisting of fungicidal agents, bactericidal agents, insecticidal agents, nematicidal agents, disinfectants, micro-organisms, rodent killers, weed killers, attracting agents, repellent agents, plant growth regulators, nutrients, plant hormones, minerals, plant extracts, acaricides or miticides, molluscicides, germination stimulants, pheromones, biological preparations, taggants, etc. It is highly advantageous that in accordance with this embodiment, the seed can be coated in one step only.

In another embodiment the seed is first coated with the second composition comprising a plant enhancing agent, and thereafter with the seed coating composition of the invention.

Conventional or otherwise suitable coating equipment or techniques may be used to coat the seeds. Suitable equipment is deemed to include drum coaters, fluidised beds, rotary coaters, side vended pan, tumble mixers and spouted beds, but any suitable equipment or technique may be used. Additionally, various coating machines are available to a person skilled in the art. The seeds may be pre-sized prior to coating. After coating, the seeds can optionally be dried.

In yet a further aspect, the invention is directed to a coated seed comprising a seed and a coating, which coating comprises inorganic particles, wherein the mean diameter (D50) of said inorganic particles as measured by laser obscuration time technology is 250 μm or less. The inorganic particles preferably comprise one or more selected from the group consisting of silicate particles, carbonate particles and sulphate particles. Such a coated seed may be prepared using the seed coating composition of the present invention. The coated seeds advantageously do not or hardly stick together by virtue of their favourable surface properties. As a consequence, the undesirable formation of seed agglomerates is prevented, or at least reduced. The coated seed of the invention can further comprise a plant protecting agent as described above.

In a further aspect, the invention is directed to the use of inorganic particles as described herein in a seed coating composition. The inorganic particles suitably act as anti-adhesive agent and prevent the seeds from sticking together.

The invention is illustrated by the following Examples.

EXAMPLES

Particle Size Measurements

Particle sizes were measured using an Ankersmid Ltd Eyetech particle analyser that applies laser obscuration time (LOT) technology. A rotating laser beam scans individual particles in the sample zone. As the particles are encountered, the laser beam is obscured and interaction signals are detected by a photodiode. Since the laser beam rotates with a constant speed, the duration of the obscuration provides a direct size measurement of each particle.

Comparative Example 1

A cocktail containing 0.46 g of thiamethoxam, 0.16 g of mefonoxam, and 0.012 g of fludioxonil was applied to 1000 g of soybeans together with 0.22 g of a pigment dispersion containing pigment red 48:2. This resulted in seeds with high degree of tackiness.

Then, 1.183 g of a seed coating composition containing 10 wt. % of polyvinyl acetate binder, 2 wt. % polyvinyl alcohol binder, 10 wt. % effect pigment with a particle size of less than 60 μm, and 78 wt. % of water was applied to the coated soybeans. Although tackiness was to some extent reduced, the seeds still agglomerated.

Example 1

A cocktail containing 0.46 g of thiamethoxam, 0.16 g of mefonoxam, and 0.012 g of fludioxonil was applied to 1000 g of soybeans together with 0.22 g of a pigment dispersion containing pigment red 48:2. This resulted in seeds with high degree of tackiness.

Then, 1.183 g of a seed coating composition according to the invention containing 70 wt. % of $CaMg(CO_3)_2$ particles with a D50 of 50 μm, 10 wt. % of polyvinyl acetate, 2 wt. % polyvinyl alcohol and 18 wt. % of water was applied together with the cocktail to 1000 g of soybeans. The resulting soybeans did not agglomerate and neither caused undesirable dusting.

Comparative Example 2

A cocktail containing 0.35 g of Metalaxyl-M, 0.2 g of cymoxanil, 0.1 g of fludioxonil, 0.53 g of thiamethoxam and 2 g of water was applied in an amount of 5 ml/kg of peas. This caused the peas to agglomerate.

When 0.8 wt. % of the water in the cocktail was replaced by a seed coating composition containing 10 wt. % polyvinyl acetate binder, 2 wt. % polyvinyl alcohol binder, 10 wt. % effect pigment with a particle size of less than 60 μm, and 78 wt. % of water, the peas still stuck together.

Example 2

A cocktail containing 0.35 g of Metalaxyl-M, 0.2 g of cymoxanil, 0.1 g of fludioxonil, 0.53 g of thiamethoxam and 2 g of water was applied in an amount of 5 ml/kg to peas. This caused the peas to agglomerate.

When 0.8 g of the seed coating composition described in Example 1 was added to the cocktail and the inventive cocktail was applied in an amount of 5 ml/kg to peas, the seeds were found not to agglomerate and have very nice flow ability.

Example 3

A total cocktail formulation was applied on soybeans. For this application three tanks were used.

Tank 1 contained Trilex 2000 (Trifloxystrobin, 7.12% and Metalaxyl, 5.7%), applied at an amount of 0.65 ml/kg seed. Gaucho 600 (imidacloprid: 1-[(6-Chloro-3-pyridinyl)methyl]-N-nitro-2-imidazolidinimine 48.7%) at a rate of 1.04 ml/kg seed. Yield Shield (*Bacillus pumilis* GB34) applied at a rate of 0.065 ml/kg seed. Beside the plant protecting agents a colorant (red 48:2) was added, to colour the seeds red at a rate of 0.326 ml/kg and to give a nice metallic cosmetic effect the Celgard 96487 was also added.

In tank two Optimize (Optimize® LCO Promoter Technology® obtained from EMD Crop BioScience, a seed-applied product that enhances natural growth processes) was available. Optimize® was applied in a rate of 2.77 ml/kg seed.

In tank three, a composition containing 70 wt. % of $CaMg(CO_3)_2$ particles with a D50 of 38 μm, 10 wt. % of polyvinyl acetate and 20 wt. % of water was available.

The three tanks met at the treater, where the whole cocktail was applied as one formulation. After the treater the soybeans went onto a 28 foot belt conveyor that had a rubber let down ladder attached and than the seeds fall into a container. The composition containing $CaMg(CO_3)_2$ particles at a rate of 1.53 ml/kg seed gave considerable improvement in comparison to the cocktail without the composition containing $CaMg(CO_3)_2$ particles (only tank 1 and 2). The seeds flowed out very nice, and no agglomerates were formed.

Example 4

Pea seed was treated with the plant protection product Wakil XL from Syngenta Crop Protection Ltd (a triple-action pea seed treatment containing as active ingredients Metalaxyl-M, fludioxonil, and cymoxanil) and water. The Wakil XL dosage was 2 g/kg seed, the water dosage was 3.55 g/kg seed. The Wakil XL was dissolved in the water before coating the seeds. A first batch pea seeds were coated with the Wakil XL solution. A second batch of pea seeds were coated with a mixture of the Wakil XL solution and a DISCO™ AG L-800 formulation from INCOTEC, the Netherlands (a formulation according to the invention containing 65 wt. % of inorganic particles having a mean particle size (D50) of 37 μm and a mean particle size (D90) of 73 μm). A third bath of pea seeds were coated with a mixture of the Wakil XL solution and Sepiret® 2020 formulation from Becker Underwood (a comparative formulation containing 22 wt. % of Al particles and Red 112 particles having a particle size of less than 250 μm).

Wakil XL is a red coloured plant protection product that dries relatively bad. Without mixing this product with a coating composition the pea seeds gave off a red colour during subsequent handling of the seed (such as in a sorting machine, packing machine, transport, and a sowing machine). In addition, the pea seed stuck to the walls of the machines, the silo, and also stuck to itself giving rise to seed agglomerates. Applying a Sepiret® 2020 formulation did not result in an improvement. The pea seed gave off similar amounts of red colour and stuck just as much. However, application of the inventive DISCO™ AG L-800 formulation resulted in seed that hardly gave off red colour and hardly stuck to the machine and the silo.

Example 5

Pea seeds were coated with the compositions as defined in Table 1. All amounts are given per kg of pea seed. Cruiser FS 350 is a plant protection product from Syngenta Crop Protection Ltd, containing 30 wt. % of the active ingredient thiamethoxam.

After the slurry was applied to the seeds, the seeds were transferred in plastic bottles and shaken. The bottles were examined for colour given of by the seeds.

TABLE 1

| Sample | Slurry total ml | Wakil XL g | Cruiser FS 350 g | Formulation | Dry flow % | Drill flow % |
|---|---|---|---|---|---|---|
| 1 | 4 | 2 | 0 | no | 100 | 100 |
| 2 | 4 | 2 | 0 | 0.6 ml AG L-800 | 114 | 108 |
| 3 | 4 | 2 | 1.5 | no | 100 | 100 |
| 4 | 4 | 2 | 1.5 | 0.8 ml AG L-800 | 103 | 108 |

The coated seeds wherein the DISCO™ AG L-800 formulation was included in the slurry did not gave off a red colour (samples 2 and 4), whereas in the absence of the DISCO™ AG L-800 formulation, the seeds gave off a red colour to the plastic bottle (samples 1 and 3). This is illustrated in the photographs of the emptied plastic bottles of samples 1-4 in FIG. 1.

In addition, in the absence of the DISCO™ AG L-800 formulation the pea seeds were much stickier. Further, Table 1 demonstrates that both the dry flow and the drill flow of the pea seeds is considerably improved when including the DISCO™ AG L-800 formulation in the seed coating.

Example 6

Pea seeds were coated with the compositions as defined in Table 2. The formulation DISCO™ AG L-250 from INCOTEC, the Netherlands contained 10 wt. % of $TiO_2$ coated mica particles in the formulation, whereas the DISCO™ AG L-800 contains 65 wt. % of inorganic particles in the formulation. The particle size distribution of DISCO™ AG L-250 is such that D50 is 31 μm and D90 is 60 μm. The particle size distribution of DISCO™ AG L-800 is such that D50 is 37 μm, and D90 is 73 μm. All amounts are given per kg of pea seed.

After the slurry was applied to the seeds, the seeds were transferred in plastic bottles and shaken. The bottles were examined for colour given of by the seeds.

TABLE 2

| Sample | Water g | Wakil XL g | Cruiser FS 350 g | Formulation | Flow sec./hits needed to move the seeds |
|---|---|---|---|---|---|
| 5 | 1.2 | 1.6 | 1.4 | 0.8 g AG L-250 | 8.7/3 |
| 6 | 1.2 | 1.6 | 1.4 | 0.8 g AG L-800 | 7/0 |
| 7 | 1.2 | 1.6 | 1.4 | no | 8.7/3 |

Table 2 above shows that the wet flow of the pea seed samples treated with DISCO™ AG L-800 was considerably improved over pea seed samples treated with DISCO™ AG L-250. This is indicative for a strong decrease in the stickiness of the coated pea seeds.

The invention claimed is:

1. A seed coating composition comprising at least about 1 wt. % water based on a total weight of the seed coating composition and at least 35 wt. % by weight of the seed coating composition of inorganic particles, wherein 50 mass percent of the inorganic particles as measured by laser obscuration time technology have a particle size of 250 μm or less and 50 mass percent of the inorganic particles have a particle size of at least 10 μm.

2. The seed coating composition according to claim 1, wherein said inorganic particles comprise one or more selected from the group consisting of silicate particles, carbonate particles and sulphate particles.

3. The seed coating composition according to claim 2, wherein said silicate particles comprise one or more selected from the group consisting of kaolin, talc and mica.

4. The seed coating composition according to claim 2, wherein said carbonate particles comprise one or more selected from the group consisting of $CaCO_3$, $CaFe(CO_3)_2$, $CaMg(CO_3)_2$, $CaZn(CO_3)_2$, and $BaCa(CO_3)_2$.

5. The seed coating composition of claim 2, wherein said sulphate particles comprise barium sulphate.

6. The seed coating composition of claim 1, wherein 50 mass percent of the inorganic particles have a particle size of 100 μm or less and 50 mass percent of the inorganic particles have a particle size of at least 10 μm as measured by laser obscuration time technology.

7. The seed coating composition of claim 1, wherein said inorganic particles are present in said composition in an amount of 35-95 wt. % based on total weight of the composition.

8. The seed coating composition of claim 1, further comprising a binder.

9. The seed coating composition of claim 1, further comprising a wax.

10. The seed coating composition of claim 1, further comprising one or more selected from a wetting and dispersing agent, an additional solvent, a thickener, a coloring agent, a filler, an anti-foaming agent, a biocide, and an effect pigment.

11. The seed coating composition of claim 1, wherein said coating composition has a water content of less than 50 wt. %, based on the total weight of said composition.

12. The seed coating composition of claim 1, further comprising one or more plant enhancing agents selected from the group consisting of a fungicidal agent, bactericidal agent, insecticidal agent, nematicidal agent, disinfectant, micro-organism, rodent killer, weed killer, attracting agent, repellent agent, plant growth regulator, nutrient, plant hormone, mineral, plant extract, acaricide, miticide, molluscicide, germination stimulant, pheromone, biological preparation, and any combination thereof.

13. A seed coating composition comprising:
   5-30 wt. % of water;
   35-80 wt. % of inorganic particles, wherein 50 mass percent of the inorganic particles have a particle size of 250 μm or less as measured by laser obscuration time technology; and
   0-80 wt. % of a plant enhancing agent.

14. A method for preparing a coated seed, the method comprising coating a seed with the seed coating composition of claim 1.

15. The method according to claim 14, where the seed is coated with a blend of
   i) a seed coating composition comprising at least 1 wt. % water based on a total weight of the seed coating composition and at least 35 wt. % by weight of the seed coating composition of inorganic particles, wherein 50 mass percent of the inorganic particles as measured by laser obscuration time technology have a particle size of 250 μm or less and 50 mass percent of the inorganic particles have a particle size of at least 10 μm; and
   ii) a second composition comprising one or more plant enhancing agents selected from the group consisting of a fungicidal agent, bactericidal agent, insecticide, nematicide, disinfectant, microorganism, rodent killer, weed killer, attracting agent, repellent agent, plant growth regulator, nutrient, plant hormone, mineral, plant extract, acaricide, miticide, molluscicide, germination stimulant, pheromone, biological preparation, and any combination thereof; or the seed is first coated with said second composition and thereafter with said seed coating composition.

16. The seed coating composition of claim 4, wherein the carbonate particles comprise $CaMg(CO_3)_2$.

17. The seed coating composition of claim 6, wherein 50 mass percent of the inorganic particles as measured by laser obscuration time technology have a particle size of 80 μm or less and 50 mass percent of the inorganic particles have a particle size of at least 20 μm.

18. The seed coating composition of claim 7, wherein the inorganic particles are present in the composition in an amount of 40-80 wt % based on total weight of the composition.

19. The seed coating composition of claim 8, wherein the binder is selected from the group consisting of polyvinyl alcohol, polyvinyl acetate, acrylate, and polyurethane.

20. The seed coating composition of claim 9, wherein the wax is selected from the group consisting of carnauba wax, paraffin wax, polyethylene wax, bees wax, and polypropylene wax.

21. The seed coating composition of claim 11, wherein the seed coating composition has a water content of less than 30 wt. %, based on the total weight of the composition.

* * * * *

UNITED STATES PATENT AND TRADEMARK OFFICE
CERTIFICATE OF CORRECTION

PATENT NO.       : 8,685,886 B2                                         Page 1 of 1
APPLICATION NO. : 13/138636
DATED            : April 1, 2014
INVENTOR(S)      : Reus et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 71 days.

Signed and Sealed this
Twenty-ninth Day of September, 2015

Michelle K. Lee
*Director of the United States Patent and Trademark Office*